(12) United States Patent
Zhou

(10) Patent No.: US 11,632,424 B2
(45) Date of Patent: Apr. 18, 2023

(54) FAULT HANDLING METHOD AND DEVICE FOR GATEWAY SERVER

(71) Applicants: Beijing Jingdong Shangke Information Technology Co., Ltd., Beijing (CN); Beijing Jingdong Century Trading Co., Ltd., Beijing (CN)

(72) Inventor: Qiang Zhou, Beijing (CN)

(73) Assignees: Beijing Jingdong Shangke Information Technology Co., Ltd., Beijing (CN); Beijing Jingdong Century Trading Co.. Ltd., Beijing (CN)

( * ) Notice: Subject to any disclaimer, the term of this patent is extended or adjusted under 35 U.S.C. 154(b) by 0 days.

(21) Appl. No.: 17/043,377

(22) PCT Filed: Apr. 26, 2019

(86) PCT No.: PCT/CN2019/084642
§ 371 (c)(1),
(2) Date: Sep. 29, 2020

(87) PCT Pub. No.: WO2019/206296
PCT Pub. Date: Oct. 31, 2019

(65) Prior Publication Data
US 2021/0021671 A1    Jan. 21, 2021

(30) Foreign Application Priority Data
Apr. 28, 2018  (CN) .......................... 201810403287.0

(51) Int. Cl.
*H04L 67/1034*  (2022.01)
*H04L 41/0668*  (2022.01)
(Continued)

(52) U.S. Cl.
CPC ...... *H04L 67/1034* (2013.01); *H04L 41/0668* (2013.01); *H04L 67/101* (2013.01);
(Continued)

(58) Field of Classification Search
CPC ....... H04L 67/42; H04L 47/125; H04L 41/12; H04L 67/10; H04L 67/02; H04L 69/40;
(Continued)

(56) References Cited

U.S. PATENT DOCUMENTS 7,437,594 B1 * 10/2008 Mount ................ G06F 11/2035
709/224
2006/0153068 A1 * 7/2006 Dally .................. H04L 67/1002
370/219

(Continued)

FOREIGN PATENT DOCUMENTS

CN          1512729 A      7/2004
CN       101309167 A      11/2008
(Continued)

OTHER PUBLICATIONS

International Search Report for PCT/CN2019/084642, dated Jul. 30, 2019, 2 pages.
(Continued)

*Primary Examiner* — Ryan J Jakovac
(74) *Attorney, Agent, or Firm* — Blank Rome LLP

(57) ABSTRACT

A fault handling method for a gateway server, including: in response to a first long connection request received from a client, selecting a first master node from a master load balancing cluster, wherein the first master node establishes a long connection between the client and a service server on the basis of the first long connection request and generates session information; and in response to a determination that a fault occurs in the first master node, performing the following operations: selecting a second master node from
(Continued)

the master load balancing cluster; and selecting a first slave node from a slave load balancing cluster and controlling the second master node to send the data from the first master node to the first slave node such that the first slave node maintains the long connection between the client and the service server on the basis of the session information.

18 Claims, 7 Drawing Sheets

(51) Int. Cl.
  *H04L 67/101* (2022.01)
  *H04L 67/1027* (2022.01)
  *H04L 67/1095* (2022.01)
  *H04L 67/568* (2022.01)

(52) U.S. Cl.
  CPC ...... *H04L 67/1027* (2013.01); *H04L 67/1095* (2013.01); *H04L 67/568* (2022.05)

(58) Field of Classification Search
  CPC ..... H04L 43/10; H04L 67/1008; H04L 45/46; H04L 67/1002; H04L 67/1095; H04L 67/28; H04L 67/101; H04L 67/1034; H04L 41/0668; H04L 67/2842; H04L 67/1051; H04L 67/568; H04L 67/0668; H04L 67/1027
  See application file for complete search history.

(56) References Cited

U.S. PATENT DOCUMENTS

2016/0182678 A1 6/2016 Wang
2016/0261508 A1 9/2016 Anantharam et al.

FOREIGN PATENT DOCUMENTS

| CN | 102137104 A | 7/2011 |
| CN | 106161495 A | 11/2016 |
| CN | 106452836 A | 2/2017 |
| CN | 107454155 A | 12/2017 |

OTHER PUBLICATIONS

Second Chinese Office Action for CN 2018104032870, dated Sep. 1, 2021, 9 pages.

* cited by examiner

FAULT HANDLING METHOD AND DEVICE FOR GATEWAY SERVER

This patent application is a U.S. National Phase Application under 35 U.S.C. 371 of International Application No. PCT/CN2019/084642 filed Apr. 26, 2019, which claims priority to Chinese Patent Application No. 201810403287.0, filed Apr. 28, 2018 by the applicants BEIJING JINGDONG SHANGKE INFORMATION TECHNOLOGY CO., LTD., and BEIJING JINGDONG CENTURY TRADING CO., LTD., and entitled "Fault handling method and device for gateway server." the entire contents of which are herein incorporated by reference.

TECHNICAL FIELD

Embodiments of the present disclosure relate to the technical field of computers, and more particularly, to a failure processing method and apparatus for a gateway server.

BACKGROUND

With the development of Internet technology, more and more users begin to use the Internet, resulting in a sharp increase in access to business services at the backend. Load balancing techniques have been developed to address this problem. In general, the load balancing technology can ensure the service balancing processing of the back-end service server, so as to avoid a case where the load of a backend service server is too high.

In the prior art, when a load balancing device performs balancing processing on a service at the backend, a failure of the load balancing device often occurs. At this time, it is necessary to switch the data in the failed load balancing device to the standby device of the failed load balancing device.

SUMMARY

Embodiments of the present disclosure provides a failure processing method and apparatus for a gateway server.

In a first aspect, an embodiment of the present disclosure provides a failure processing method for a gateway server, the gateway server establishing a communication connection with a load balancing cluster, where the load balancing cluster includes a master load balancing cluster and a slave load balancing cluster, the method including: selecting a master node from the master load balancing cluster as a first master node in response to receiving a first persistent connection request from a client, wherein the first master node establishes a persistent connection between the client and a service server based on the first persistent connection request and generates session information; and in response to determining that the first master node fails, performing following operations: selecting a master node different from the first master node from the master load balancing cluster as a second master node, the second master node receiving data in the first master node; selecting a slave node from the slave load balancing cluster as a first slave node, and controlling the second master node to transmit data from the first master node to the first slave node to cause the first slave node to maintain the persistent connection between the client and the service server based on the session information.

In some embodiments, the selecting the master node from the master load balancing cluster as the first master node includes: acquiring load information of the master node in the master load balancing cluster; and selecting the master node as the first master node from the master load balancing cluster by using a load balancing algorithm.

In some embodiments, the first master node is configured to synchronize the session information into a cache cluster.

In some embodiments, the selecting the slave node from the slave load balancing cluster as the first slave node, and controlling the second master node to transmit data from the first master node to the first slave node includes: controlling the second master node to receive data in the first master node; and selecting the slave node from the slave load balancing cluster as the first slave node, and controlling the second master node to transmit data from the first master node to the first slave node, wherein the first slave node obtains the session information from the cache cluster, and determines the client and the service server that establish the persistent connection through the first master node based on the session information.

In some embodiments, after selecting the slave node from the slave load balancing cluster as the first slave node, and controlling the second master node to transmit data from the first master node to the first slave node, the method further includes: forwarding a second persistent connection request to the second master node in response to receiving the second persistent connection request from the client; and controlling the second master node to forward the second persistent connection request from the client to the first slave node, wherein the first slave node forwards the second persistent connection request from the client to the service server based on the session information.

In some embodiments, the first slave node is configured to update the session information.

In a second aspect, an embodiment of the present disclosure provides a failure processing apparatus for a gateway server, the gateway server establishing a communication connection with a load balancing cluster, wherein the load balancing cluster includes a master load balancing cluster and a slave load balancing cluster, the apparatus including: a first master node selecting unit configured to select a master node from the master load balancing cluster as a first master node in response to receiving a first persistent connection request from a client, where the first master node establishes a persistent connection between the client and a service server based on the first persistent connection request and generates session information; an execution unit configured to, in response to determining that the first master node fails, perform following operations: selecting a master node different from the first master node from the master load balancing cluster as a second master node, the second master node receiving data in the first master node; selecting a slave node from the slave load balancing cluster as a first slave node, and controlling the second master node to transmit data from the first master node to the first slave node to cause the first slave node to maintain a persistent connection between the client and the service server based on the session information.

In some embodiments, the first master node selection unit is further configured to: acquire load information of the master node in the master load balancing cluster; and select the master node as the first master node from the master load balancing cluster by using a load balancing algorithm.

In some embodiments, the first master node is configured to synchronize the session information into a cache cluster.

In some embodiments, the execution unit is further configured to; control the second master node to receive data in the first master node; and select the slave node from the slave load balancing cluster as the first slave node, and control the second master node to transmit data from the first master node to the first slave node, wherein the first slave node obtains the session information from the cache cluster, and determines the client and the service server that establish the persistent connection through the first master node based on the session information.

In some embodiments, the apparatus further includes a second persistent connection request forwarding unit configured to forward a second persistent connection request to the second master node in response to receiving the second persistent connection request from the client; and a control unit configured to control the second master node to forward the second persistent connection request from the client to the first slave node, wherein the first slave node forwards the second persistent connection request from the client to the service server based on the session information.

In some embodiments, the first slave node is configured to update the session information.

According to the failure processing method and apparatus for a gateway server provided by embodiments of the present disclosure, when a first persistent connection request from a client is received, a first master node may be selected from a master load balancing cluster, so that the first master node may establish a persistent connection between the client and a service server based on the first persistent connection request and generate session information. Then, when it is determined that the first master node is failed, a second master node may be selected from the master load balancing cluster, so that the second master node may receive data in the first master node, and finally a first slave node may be selected from the load balancing cluster, so that the first slave node may receive data in the second master node from the first master node, so that the first slave node may maintain the persistent connection between the client and the server based on the session information, thereby realizing that when the first master node in the master load balancing cluster is failed, the second master node in the master load balancing cluster and the first slave node in the slave load balancing cluster may keep the original persistent connection between the client and the service server uninterrupted.

BRIEF DESCRIPTION OF THE DRAWINGS

Other features, objects, and advantages of the present disclosure will become more apparent by reading the detailed description of non-limiting embodiments made with reference to the following drawings.

DETAILED DESCRIPTION

Figure 1:
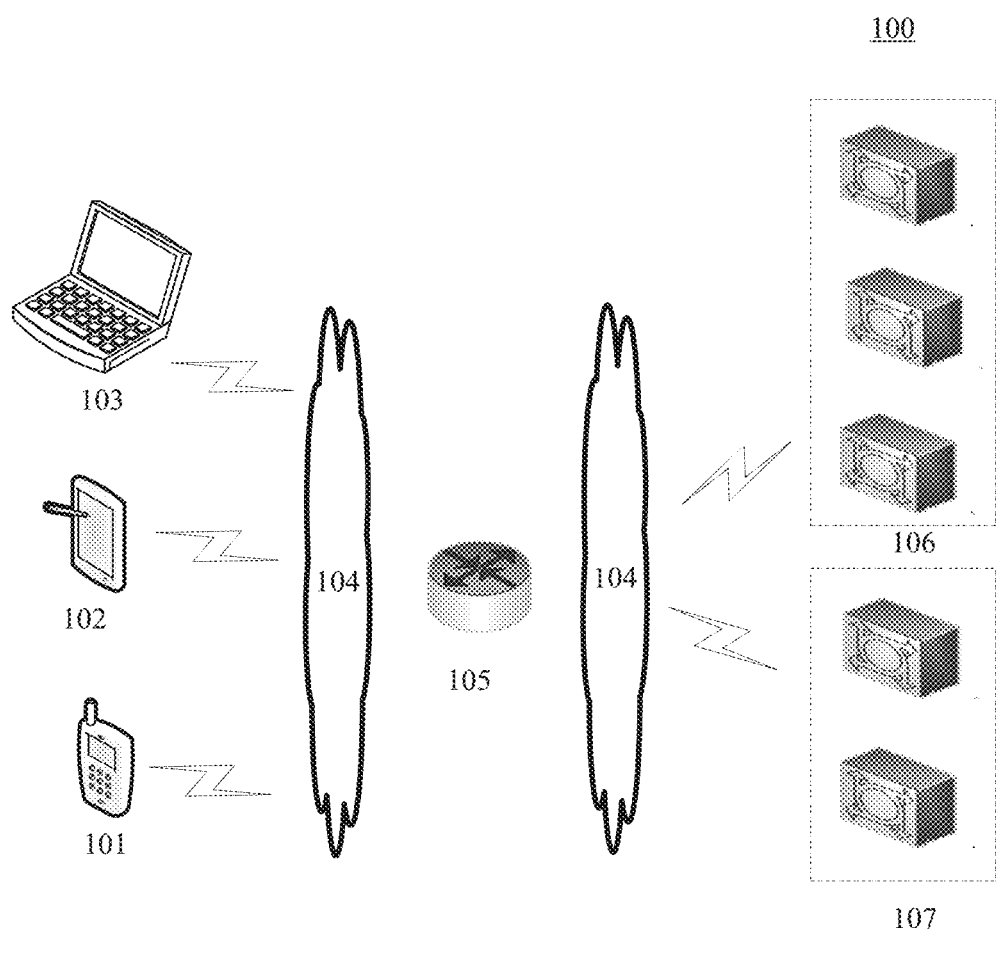
FIG. 1 is an example system architecture diagram in which embodiments of the present disclosure may be applied.

The present disclosure is described in further detail below with reference to accompanying drawings and embodiments. It is to be understood that specific embodiments described herein are merely illustrative of the related disclosure and are not restrictive of the disclosure. It is also to be noted that, for ease of description, only parts related to the disclosure are shown in the drawings.

It should be noted that embodiments in the present disclosure and the features in the embodiments may be combined with each other without conflict. The present disclosure will now be described in detail with reference to the accompanying drawings and embodiments.

FIG. 1 illustrates an example system architecture 100 in which a failure processing method for a gateway server or a failure processing apparatus for a gateway server of an embodiment of the present disclosure may be applied.

As shown in FIG. 1, the system architecture 100 may include terminal devices 101, 102, and 103, a network 104, a gateway server 105, and load balancing clusters (including a master load balancing cluster 106 and a slave load balancing cluster 107). The network 104 serves to provide a medium of communication links between the terminal devices 101, 102, and 103 and the gateway server 105, as well as between the gateway server 105 and the load balancing clusters. Network 104 may include various types of connections, such as wired, wireless communication links, or fiber optic cables, or the like.

The user may interact with the gateway server 105 through the network 104 using the terminal devices 101, 102, and 103 to receive or send messages, etc. Various communication client applications, such as game applications, shopping applications, search applications, web browser applications, mailbox clients, social platform software, and the like, may be installed on the terminal devices 101, 102, and 103.

The terminal devices 101, 102, and 103 may be hardware or software. When the terminal devices 101, 102, and 103 are hardware, various electronic devices supporting transmission of the request information may be used, including but not limited to a smartphone, a tablet computer, an electronic book reader, an MP3 (Moving Picture Experts Group Audio Layer III) player, an MP4 (Moving Picture Experts Group Audio Layer IV) player, a laptop portable computer, a desktop computer, and the like. When the terminal devices 101, 102, and 103 are software, they may be installed in the electronic devices listed above. It may be implemented as a plurality pieces of software or a plurality of software modules (e.g., for providing distributed services) or as a single piece of software or a single software module, which is not specifically limited herein.

The gateway server 105 may provide various services, such as a background server that distributes persistent connection requests sent by a user through the terminal devices 101, 102, and 103. The background server may perform analysis processing on the received data such as the persistent connection request, so as to implement the exchange function. The gateway server 105 may also be a switching device such as a switch or a router.

The master load balancing cluster 106 may include at least one master node, each master node may be used to balance traffic in the traffic server at the back end. The slave load balancing cluster 107 may include at least one slave node, each slave node may be used to recover data in the failed master node.

It should be noted that the failure processing method for a gateway server provided in embodiments of the present disclosure is generally executed by the gateway server 105, and accordingly, the failure processing apparatus for a gateway server is generally provided in the gateway server 105.

It should be noted that the gateway server may be hardware or software. When the gateway server is hardware, a distributed server cluster composed of multiple gateway servers may be implemented, or a single gateway server may be implemented. When the gateway server is software, it may be implemented as a plurality pieces of software or a plurality of software modules (e.g., for providing distributed services), or it may be implemented as a single piece of software or a single software module, which is not specifically limited herein.

It should be understood that the number of the terminal devices, the network, the gateway server, and the nodes in the load balancing cluster in FIG. 1 are merely illustrative. There may be any number of terminal devices, networks, gateway servers, and nodes in the load balancing cluster, as required by the implementation.

Figure 2:
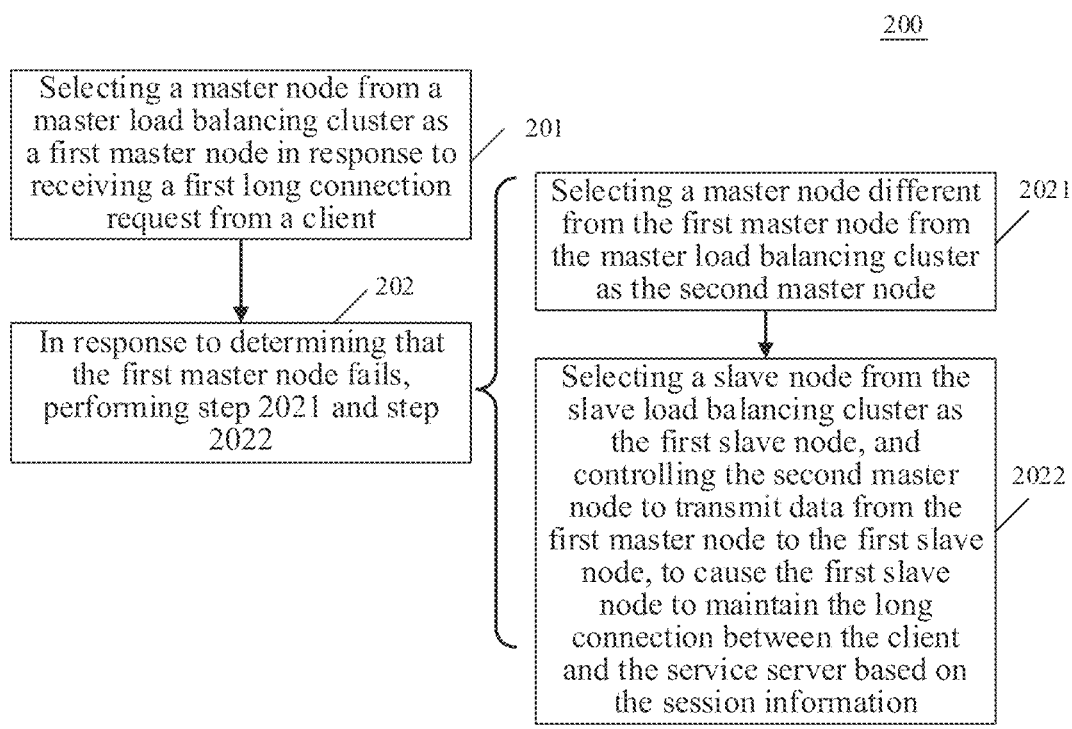
FIG. 2 is a flowchart of a failure processing method for a gateway server according to an embodiment of the present disclosure.

With continuing reference to FIG. 2, a flow 200 of a failure processing method for a gateway server according to an embodiment of the present disclosure is shown. The failure processing method for a gateway server includes the following steps.

Step 201: selecting a master node from a master load balancing cluster as a first master node in response to receiving a first persistent connection request from a client.

In the present embodiment, the executing body of the failure processing method for a gateway server (for example, the gateway server 105 shown in FIG. 1) may receive a first persistent connection request from the client of a user through the wired connection method or the wireless connection method. The persistent connection request herein may be used to request to establish a persistent connection between the client and the service server. Further, after receiving the first persistent connection request from the client, the executing body may select a master node from the master load balancing cluster as the first master node. The executing body (for example, the gateway server 105 shown in FIG. 1) may establish a communication connection with the load balancing cluster. Here, the load balancing cluster may include a master load balancing cluster and a slave load balancing cluster, where the master load balancing cluster may consist of master nodes, and the slave load balancing cluster may consist of slave nodes. After the executing body selects the first master node, the first persistent connection request may be forwarded to the acquired first master node. Thus, the first master node may forward the first persistent connection request from the client to the service server to establish a persistent connection between the client and the service server. It will be appreciated that the service server receiving the first persistent connection request may be a service server selected from the service server cluster based on the load balancing principle by the first master node. The first master node may also generate session information accordingly when establishing a persistent connection between the client and the service server. It should be noted that the above wireless connection means may include, but are not limited to, a 3G/4G connection, a WiFi connection, a Bluetooth connection, a WiMAX connection, a Zigbee connection, a UWB (ultra wideband) connection, and other wireless connection means now known or developed in the future.

The service server may be a server that provides back-end support for a service request initiated by a user, such as web browsing or game start. The service server may be a single server or a service server cluster composed of a plurality of server nodes. The load balancing cluster may be arranged between a gateway server and a service server for distributing network requests from different clients to available service servers, and the respective nodes in the load balancing cluster (including master nodes in the master load balancing cluster and slave nodes in the slave load balancing cluster) may be a physical device or a virtual device having a load balancing function, such as a load balancer, a load scheduler of a LVS (Linux Virtual Server).

The master nodes in the master load balancing cluster may be independent of each other, and the master nodes may be connected to each other through a network. The master load balancing cluster may interact with the service server and the gateway server so that each master node may establish a persistent connection between the client and the service server under normal operating conditions. Further, the cluster configuration of master nodes in the master load balancing cluster may also improve the scalability of the master load balancing cluster. Thus, in actual use, the number of master nodes in the master load balancing cluster may be increased to achieve the lateral expansion of the cluster, or the number of master nodes in the master load balancing cluster may alternatively be decreased.

In some alternative implementations of the present embodiment, the session information may include the source address, source port, destination address, destination port, and the like. Specifically, when the client sends the first persistent connection request to the service server, the source address and the source port of the first persistent connection request may be an address and port of the client that sends the first persistent connection request, and the destination address and the destination port may be an addresses (e.g., virtual addresses) and port of the first master node. Therefore, the first persistent connection request may be forwarded to the first master node via the client, and the first master node may further perform full address translation on the first persistent connection request in the FULLNAT mode, thus the source address and the source port of the first persistent connection request may be the address and the port of the first master node, and the destination address and the destination port may be the address and the port of the service server. It will be appreciated that the session information generated by the first node may further include information such as a network protocol, a timestamp, and the like. Generally, the FULLNAT mode may refer to a mode of DNAT (destination address translation) +SNAT (source address translation). After the source address translation is performed, the reply to the persistent connection request generated by the service server may be returned to the first master node again, so that the FULLNAT mode has strong adaptability to the network environment.

In some alternative implementations of the present embodiment, the executing body may select the master node from the master load balancing cluster as the first master node by: first acquiring load information of each master node in the master load balancing cluster, and then selecting a master node from the master load balancing cluster as the first master node by using a load balancing algorithm. It will be appreciated that the executing body may also use other method strategies to select the first master node from the master load balancing cluster, which is not uniquely limited herein.

Step 202, in response to determining that the first master node fails, performing step 2021 and step 2022.

In the present embodiment, the executing body may monitor the operation state of each master node in the master load balancing cluster, and performing the step 2021 and step 2022 when it is determined that the first master node in the master load balancing cluster is failed. In the step 2021 and step 2022, the persistent connection between the client and the service server established based on the first persistent connection request described above may be maintained. The details are as follows.

Step 2021: selecting a master node different from the first master node from the master load balancing cluster as the second master node.

In the present embodiment, when it is determined that the first master node in the master load balancing node is failed (e.g., down), the executing body may select a master node from the master load balancing cluster as the second master node so that the second master node may receive data from the failed first master node. The data in the first master node may be generated by the first master node being accessed by the executing body and service server. The second master node is a master node different from the first master node in the master load balancing cluster, and the selected second master node may be a single master node, or the selected second master node may also be a plurality of master nodes. As an example, the executing body may deploy a strategy for selecting a second master node in the master load balancing cluster in advance, so that at least one master node may be selected as the second master node in the master load balancing cluster by using the strategy.

Step 2022: selecting a slave node from the slave load balancing cluster as the first slave node, and controlling the second master node to transmit data from the first master node to the first slave node, to cause the first slave node to maintain the persistent connection between the client and the service server based on the session information.

In the present embodiment, when it is determined that the first master node in the master load balancing node is failed, the executing body may also select a slave node from the slave load balancing cluster as the first slave node. The executing body may then send a control instruction to the second master node so that the second master node may send data from the first master node to the selected first slave node. The first slave node may query session information generated by the first master node, and maintain the persistent connection between the client and the service server using information such as a source address and a destination address included in the generated session information. Therefore, when the first master node fails, the method makes it possible to keep the original persistent connection between the client established by the first master node and the service server uninterrupted, thereby avoiding the phenomenon of getting stuck in the process of using the application by the user.

The slave nodes in the slave load balancing cluster may be independent of each other, and the slave nodes may be connected to each other through a network. The slave nodes in the slave load balancing cluster may have the same virtual IP address, and each slave node may have an intranet IP address of each master node in the master load balancing cluster. Thus, the first slave node may receive data from the first master node from the second master node. It will be appreciated that the cluster configuration of each slave node in the load balancing cluster may also improve the scalability of the slave load balancing cluster. In practical use, the number of slave nodes in the load balancing cluster may be increased to achieve the lateral expansion of the cluster, or the number of slave nodes in the load balancing cluster may alternatively be decreased. Further, the number of slave nodes included in the slave load balancing cluster may be less than the number of master nodes included in the master load balancing cluster. The number of load balancing devices (including master nodes in the master load balancing cluster and slave nodes in the slave load balancing cluster) in the present embodiment is smaller than a master-slave structure (each master node corresponds to one slave node) of load balancing in the prior art, thereby reducing the cost of load balancing.

In some alternative implementations of the present embodiment, the first slave node may continue to receive a second persistent connection request from the client and forward the second persistent connection request to the second master node after keeping the original persistent connection between the client and the service server established by the first master node uninterrupted, so that the second master node may forward the second persistent connection request from the client to the first slave node. The first slave node may forward the second persistent connection request from the client to the service server based on the session information generated by the first master node. It can be seen that after the first slave node maintains the original persistent connection between the client and the service server established by the first master node, the combination of the first slave node and the second master node in the master load balancing cluster can continue to support services such as web page browsing and video viewing between the client and the service server instead of the failed first master node.

According to the failure processing method for a gateway server provided in the above embodiment of the present disclosure, when a first persistent connection request from a client is received, a first master node may be selected from a master load balancing cluster, so that the first master node may establish a persistent connection between the client and a service server based on the first persistent connection request and generate session information, and then when it is determined that the first master node is failed, a second master node may be selected from the master load balancing cluster, so that the second master node may receive data in the first master node, and finally a first slave node may be selected from the load balancing cluster, so that the first slave node may receive data in the second master node from the first master node, such that the first slave node may maintain the persistent connection between the client and the service server based on the session information, thereby realizing that when the first master node in the master load balancing cluster is failed, the second master node in the master load balancing cluster and the first slave node in the slave load balancing cluster may maintain the original persistent connection between the client and the service server.

Figure 3:
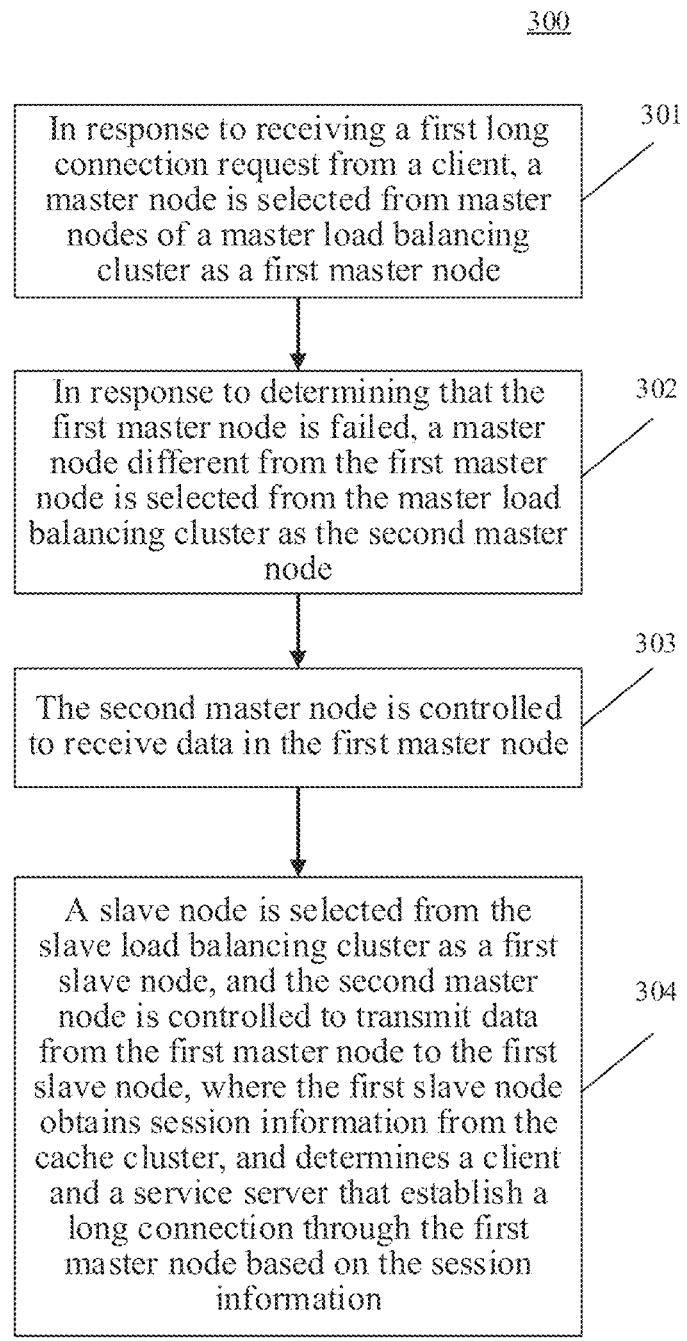
FIG. 3 is a flowchart of a failure processing method for a gateway server according to another embodiment of the present disclosure.

Referring further to FIG. 3, a flow 300 of a failure processing method for a gateway server according to another embodiment is shown. The flow 300 of the failure processing method for a gateway server includes the following steps.

Step 301: in response to receiving a first persistent connection request from a client, a master node is selected from master nodes of a master load balancing cluster as a first master node.

In the present embodiment, the executing body (for example, the gateway server 105 shown in FIG. 1) of the failure processing method for a gateway server may receive the first persistent connection request from the client of the user through the wired connection method or the wireless connection method. Further, after determining that the executing body receives the first persistent connection request from the client, the executing body may select the master node as the first master node from the master load balancing cluster. The executing body (for example, the gateway server 105 shown in FIG. 1) may establish a communication connection with the load balancing cluster. Here, the load balancing cluster may include a master load balancing cluster and a slave load balancing cluster, the master load balancing cluster may consist of master nodes, and the slave load balancing cluster may consist of slave nodes. After the executing body selects the first master node, the first master node may establish a persistent connection between the client and the service server based on the first persistent connection request from the client. The first master node may also generate session information accordingly when establishing the persistent connection between the client and the service server.

Step 302, in response to determining that the first master node is failed, a master node different from the first master node is selected from the master load balancing cluster as the second master node.

In this embodiment, a cache cluster for caching session information may be pre-constructed. After generating the session information, the first master node may synchronize the generated session information into the cache cluster. It will be appreciated that the cache cluster may be a set of independent, networked computers that form a set and are managed in a single system mode. Thus, information between the computer devices in the cache cluster may also be synchronized. When the first master node interacts with the cache cluster, the cache cluster is like a separate server, and the cluster configuration can be used to improve availability and scalability. Thus, in actual use, the number of devices in the cache cluster may be increased to achieve lateral expansion of the cluster, or the number of devices in the cache cluster may alternatively be decreased.

In the present embodiment, when it is determined that the first master node in the master load balancing node is failed, the executing body may select the second master node from the master load balancing cluster. The second master node is a master node different from the first master node in the master load balancing cluster, and the selected second master node may be a single master node, or the selected second master node may also be a plurality of master nodes. As an example, the executing body may deploy a strategy for selecting a second master node in the master load balancing cluster in advance so that it may select at least one master node as the second master node in the master load balancing cluster by using the strategy.

Step 303, the second master node is controlled to receive data in the first master node.

In the present embodiment, the executing body may control the selected second master node to receive data in the failed first master node based on the selected second master node in step 302. At this time, the second master node contains the data of the second master node itself and the data from the first master node.

Step 304: a slave node is selected from the slave load balancing cluster as a first slave node, and the second master node is controlled to transmit data from the first master node to the first slave node, where the first slave node obtains session information from the cache cluster, and determines a client and a service server that establish a persistent connection through the first master node based on the session information.

In the present embodiment, the executing body may select the slave node from the slave load balancing cluster as the first slave node for bearing the data in the failed first master node so that the first slave node may receive the data from the failed first master node in the second master node. Then, the first slave node may acquire the session information generated and stored by the first master node from the cache cluster, and extract the source address, destination address, and the like included in the acquired session information, so that the client and the service server that establish the persistent connection through the failed first master node may be determined.

In some alternative implementations of the present embodiment, the first slave node may also cache the acquired session information locally after acquiring the session information. Thus, when the client sends a request, such as web page browsing, to the service server again, the executing body may send the request to the first slave node via the second master node after receiving the request. At this time, the first slave node may directly query the session information locally to determine the service server that is persistent connected to the client sending the request, so that the first slave node may send the request to the determined service server.

In this embodiment, after the client and the service server that establish the persistent connection through the failed first master node by the determined first master node, the first slave node may keep the determined persistent connection between the client and the service server uninterrupted. Therefore, the first master node may receive the determined request of the client and forward the received request to the service server, so that the original persistent connection between the client and the service server established by the failed first master node is kept uninterrupted, and the phenomenon that the client application is stuck is avoided.

In some alternative implementations of the present embodiment, the first slave node may receive a second persistent connection request, such as web page browsing, from the client again while keeping the persistent connection between the client and the service server uninterrupted. Moreover, when the first slave node forwards the request to the service server, the session information in the cache cluster may be updated, so that the timestamp and the like in the session information may be updated in time.

Figure 4A:
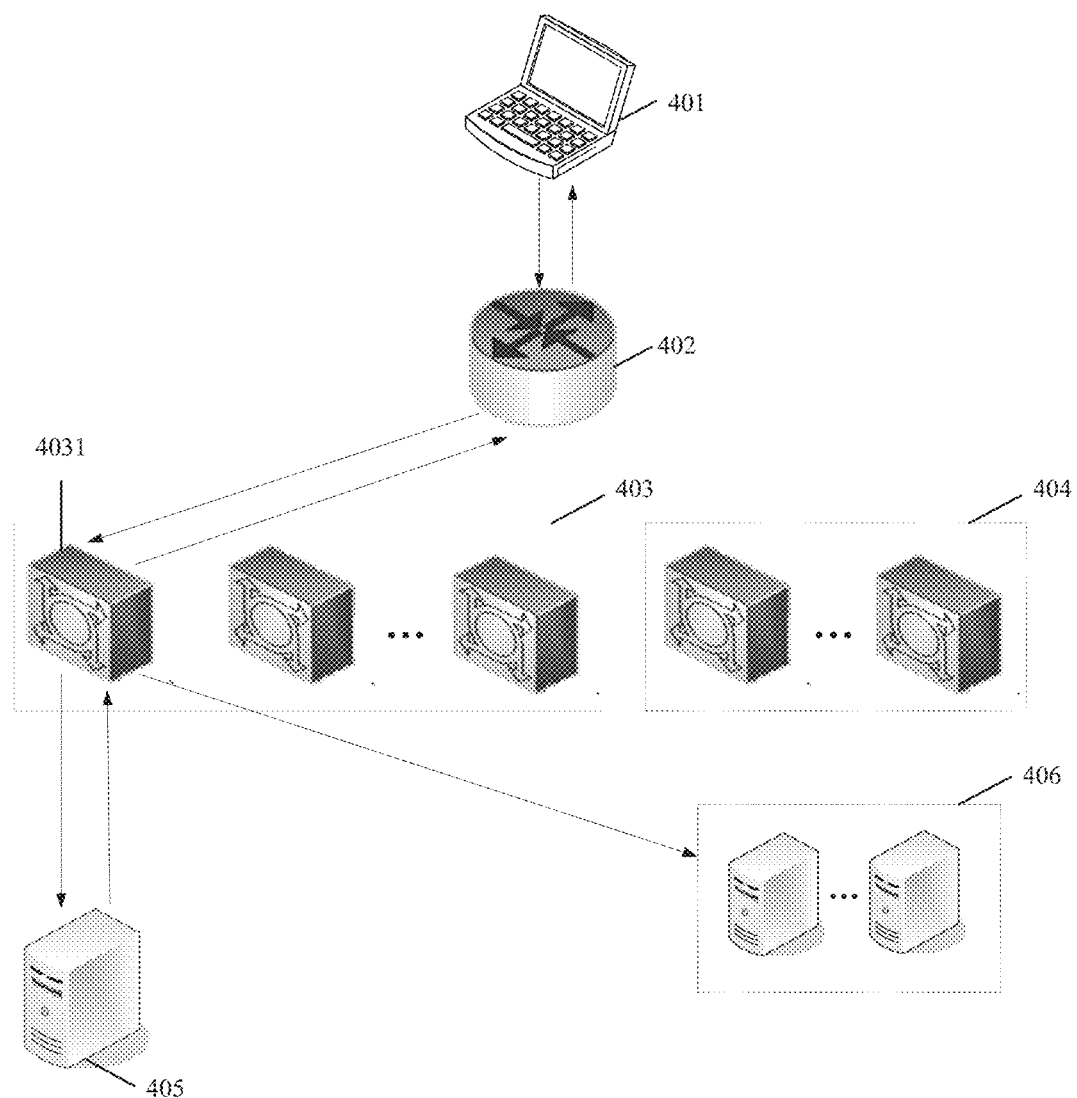
FIGS. 4A-4B are a schematic diagram of an application scenario of a failure processing method for a gateway server according to embodiments of the present disclosure.
Figure 4B:
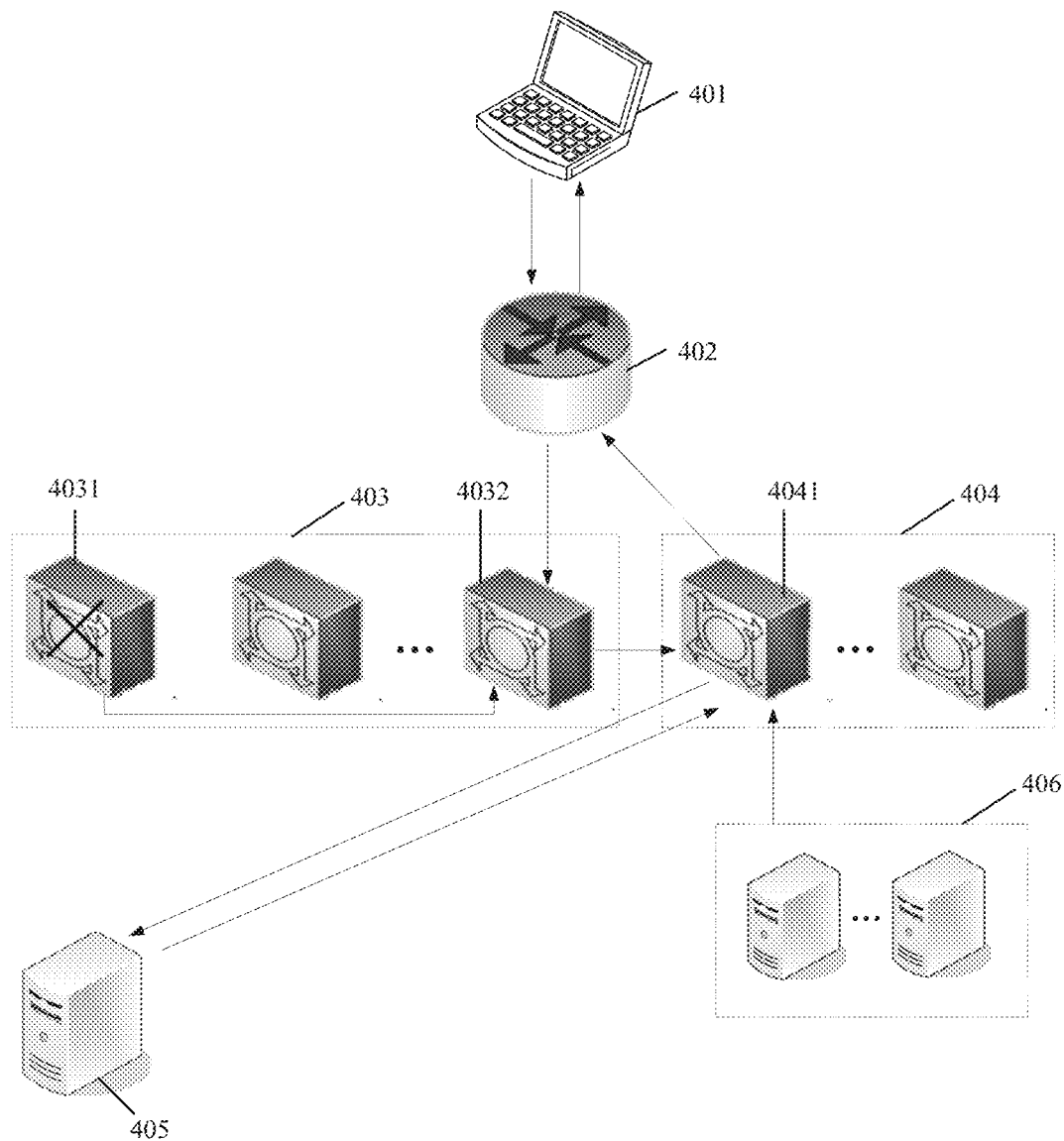

Continuing to refer to FIGS. 4A-4B, FIGS. 4A-4B illustrate a schematic diagram of an application scenario of a failure processing method for a gateway server according to the present embodiment. As shown in FIG. 4A, after receiving the first persistent connection request sent by the user through the client 401, the gateway server 402 may select the first master node 4031 from the master load balancing cluster 403. The first master node 4031 may establish a persistent connection between the client 401 and the service server 405 based on the first persistent connection request, as shown in FIG. 4A, and generate and synchronize session information into the cache cluster 406. Then, when it is determined that the first master node 4031 is failed, as shown in FIG. 4B, the gateway server 402 may select a second master node 4032 different from the first master node 4031 from the master load balancing cluster 403 so that the second master node 4032 may receive data from the first master node 4031. Finally, the gateway server 402 may select the first slave node 4041 from the slave load balancing cluster 404 so that the second master node 4032 may transmit data from the first master node 4031 to the first slave node 4041, as shown in FIG. 4B. The first slave node 4041 may acquire session information generated by the first master node 4031 from the cache cluster 406, and determine the client 401 and the service server 405 that establish the persistent connection through the first master node 4031 using the acquired session information, so as to keep the determined persistent connection between the client 401 and the service server 405 uninterrupted, as shown in FIG. 4B.

As can be seen from FIG. 3, the flow 300 of the failure processing method for a gateway server in this embodiment highlights the interaction of the first master node and the first slave node with the cache cluster as compared to the corresponding embodiment of FIG. 2. As a result, the solution described in the present embodiment achieves that a large number of session information storage requirements may be met by the cache cluster, while keeping the original persistent connection between the client and the service server established by the first master node uninterrupted.

Figure 5:
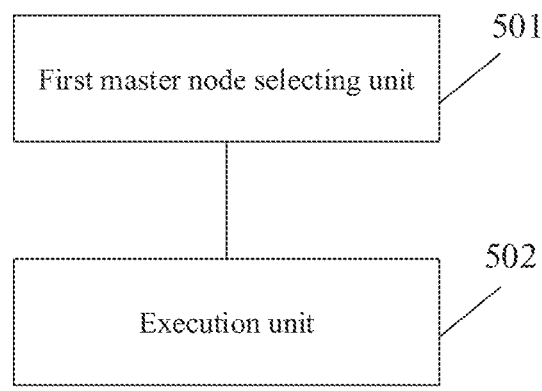
FIG. 5 is a schematic structural diagram of a failure processing apparatus for a gateway server according to an embodiment of the present disclosure.

With further reference to FIG. 5, as an implementation of the method shown in each of the above figures, an embodiment of the present disclosure provides a failure processing apparatus for a gateway server, which corresponds to the method embodiment shown in FIG. 2, and the apparatus is particularly applicable to the gateway server.

As shown in FIG. 5, the failure processing apparatus 500 for a gateway server according to the present embodiment includes: a first master node selecting unit 501 and an execution unit 502. The gateway server establishes a communication connection with a load balancing cluster, the load balancing cluster including a master load balancing cluster and a slave load balancing cluster. The first master node selecting unit 501 is configured to select a master node from the master load balancing cluster as the first master node in response to receiving a first persistent connection request from a client, where the first master node establishes a persistent connection between the client and a service server based on the first persistent connection request and generates session information; The execution unit 502 is configured to, in response to determining that the first master node is failed, perform following operations: selecting a master node different from the first master node from the master load balancing cluster as the second master node, where the second master node receives data in the first master node; selecting a slave node from the slave load balancing cluster as a first slave node, and controlling the second master node to transmit data from the first master node to the first slave node to cause the first slave node to maintain the persistent connection between the client and the service server based on the session information.

According to the failure processing apparatus for a gateway server provided in the foregoing embodiment of the present disclosure, upon receiving a first persistent connection request from a client, the first master node selecting unit 501 may select a master node from a master load balancing cluster as the first master node, so that the first master node may establish a persistent connection between the client and a service server based on the first persistent connection request and generate session information. When it is determined that the first master node is failed, the execution unit 502 may perform the following operations: selecting a master node different from the first master node from the master load balancing cluster as the second master node so that the second master node may receive data in the first master node; and selecting a first slave node from the slave load balancing cluster, and controlling the second master node to transmit data from the first master node to the first slave node, so that the first slave node may maintain a persistent connection between the client and the service server based on the session information, thereby realizing that when the first master node in the master load balancing cluster fails, the second master node in the master load balancing cluster and the first slave node in the slave load balancing cluster are utilized to maintain an original persistent connection between the client and the service server.

In some alternative implementations of the present embodiment, the first master node selection unit 501 is further configured to acquire load information of the master node in the master load balancing cluster; and select the master node as the first master node from the master load balancing cluster by using a load balancing algorithm.

In some alternative implementations of the present embodiment, the first master node is configured to synchronize session information into the cache cluster.

In some alternative implementations of the present embodiment, the execution unit 502 is further configured to control the second master node to receive data in the first master node; select the slave node from the slave load balancing cluster as a first slave node, and control the second master node to transmit data from the first master node to the first slave node, where the first slave node obtains session information from the cache cluster, and determines the client and the service server that establish the persistent connection through the first master node based on the session information.

In some alternative implementations of the present embodiment, the apparatus 500 further includes a second persistent connection request forwarding unit configured to forward a second persistent connection request to the second master node in response to receiving the second persistent connection request from the client; and a control unit configured to control the second master node to forward the second persistent connection request from the client to the first slave node, where the first slave node forwards the second persistent connection request from the client to the service server based on the session information.

In some alternative implementations of the present embodiment, the first slave node is configured to update session information.

The units described in the apparatus 500 correspond to the steps in the method described with reference to FIGS. 2 and 3. Thus, the operations and features described above with respect to the method are equally applicable to the apparatus 500 and the units contained therein, and repeated details are not described herein.

Figure 6:
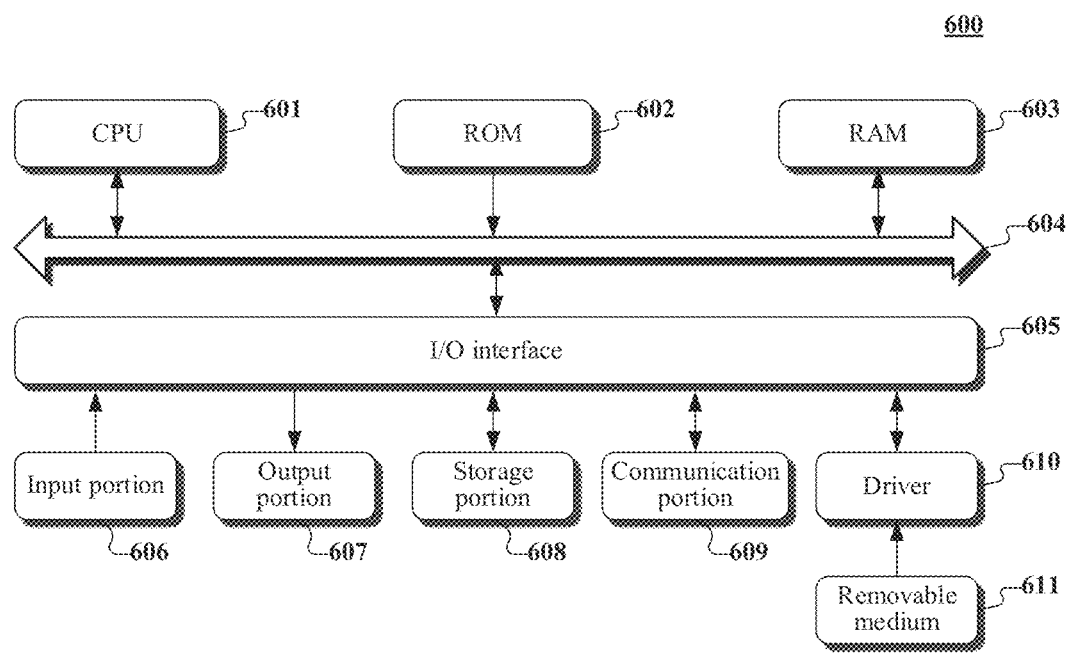
FIG. 6 is a schematic structural diagram of a computer system suitable for implementing a gateway server according to an embodiment of the present disclosure.

Referring now to FIG. 6, there is shown a schematic structural diagram of a computer system 600 suitable for implementing a gateway server according to an embodiment of the present disclosure. The gateway server shown in FIG. 6 is merely an example and should not impose any limitations on the functionality and scope of use of embodiments of the present disclosure.

As shown in FIG. 6, the computer system 600 may include a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components may be connected to the I/O interface 605: an input portion 606 including a keyboard, a mouse, or the like; an output portion 607 including a cathode ray tube (CRT), a liquid crystal display (LCD), a speaker, or the like; a storage portion 608 including a hard disk or the like; and a communication portion 609 including a network interface card such as a LAN card, a modem, or the like. The communication section 609 performs communication processing via a network such as the Internet. The driver 610 is also connected to the I/O interface 605 as desired. A removable medium 611, such as a magnetic disk, an optical disk, a magneto-optical disk, a semiconductor memory, or the like, is mounted on the driver 610 as required so that a computer program read therefrom is mounted on the storage portion 608 as required.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609 and/or installed from the removable medium 611. The computer program, when executed by the central processing unit (CPU) 601, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functionalities and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functionalities. It should also be noted that, in some alternative implementations, the functionalities denoted by the blocks may occur in a sequence different from the sequences shown in the accompanying drawings. For example, any two blocks presented in succession may be executed, substantially in parallel, or they may sometimes be in a reverse sequence, depending on the functionality involved. It should also be noted that each block in the block diagrams and/or flow charts as well as a combination of blocks may be implemented using a dedicated hardware-based system performing specified functionalities or operations, or by a combination of a dedicated hardware and computer instructions.

The units involved in the embodiments of the present disclosure may be implemented by means of software or hardware. The described units may also be provided in a processor, for example, may be described as: a processor including a first master node selecting unit and an execution unit. Here, the names of these units do not in some cases constitute limitations to such units themselves. For example, the first master node selecting unit may also be described as "a unit configured to select a master node from the master load balancing cluster as a first master node in response to receiving a first persistent connection request from a client".

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: select a master node from the master load balancing cluster as a first master node in response to receiving a first persistent connection request from a client, where the first master node establishes a persistent connection between the client and a service server based on the first persistent connection request and generates session information; and in response to determining that the first master node fails, perform following operations: selecting a master node different from the first master node from the master load balancing cluster as a second master node, the second master node receiving data in the first master node; selecting a slave node from the slave load balancing cluster as a first slave node, and controlling the second master node to transmit data from the first master node to the first slave node to cause the first slave node to maintain a persistent connection between the client and the service server based on the session information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functionalities disclosed in the present disclosure are examples.

What is claimed is:

1. A failure processing method for a gateway server, the gateway server establishing a communication connection with a load balancing cluster, wherein the load balancing cluster includes a master load balancing cluster and a slave load balancing cluster, the master load balancing cluster including at least two master nodes configured to balance traffic in the gateway server and replace a failed master node, the slave load balancing cluster including at least two slave nodes configured to recover data in the failed master node, and wherein a number of slave nodes in the slave load balancing cluster is less than a number of master nodes in the master load balancing cluster, the method comprising:
    selecting a master node from the master load balancing cluster as a first master node in response to receiving a first persistent connection request from a client, wherein the first master node establishes a persistent connection between the client and a service server based on the first persistent connection request and generates session information; and
    in response to determining that the first master node fails, performing following operations: selecting a master node different from the first master node from the master load balancing cluster as a second master node, the second master node receiving data from the first master node; selecting a slave node from the slave load balancing cluster as a first slave node, and controlling the second master node to transmit data from the first master node to the first slave node to cause the first slave node to maintain the persistent connection between the client and the service server based on the session information.

2. The method of claim 1, wherein the selecting the master node from the master load balancing cluster as the first master node comprises:
    acquiring load information of the master node in the master load balancing cluster; and
    selecting the master node as the first master node from the master load balancing cluster by using a load balancing algorithm.

3. The method of claim 1, wherein the first master node is configured to synchronize the session information into a cache cluster.

4. The method of claim 3, wherein the selecting the slave node from the slave load balancing cluster as the first slave node, and controlling the second master node to transmit data from the first master node to the first slave node comprises:
    controlling the second master node to receive data in the first master node; and
    selecting the slave node from the slave load balancing cluster as the first slave node, and controlling the second master node to transmit data from the first master node to the first slave node, wherein the first slave node obtains the session information from the cache cluster, and determines the client and the service server that establish the persistent connection through the first master node based on the session information.

5. The method of claim 1, wherein after selecting the slave node from the slave load balancing cluster as the first slave node, and controlling the second master node to transmit data from the first master node to the first slave node, the method further comprises:
    forwarding a second persistent connection request to the second master node in response to receiving the second persistent connection request from the client; and
    controlling the second master node to forward the second persistent connection request from the client to the first slave node, wherein the first slave node forwards the second persistent connection request from the client to the service server based on the session information.

6. The method of claim 5, wherein the first slave node is configured to update the session information.

7. A failure processing apparatus for a gateway server, the gateway server establishing a communication connection with a load balancing cluster, wherein the load balancing cluster includes a master load balancing cluster and a slave load balancing cluster, the master load balancing cluster including at least two master nodes configured to balance traffic in the gateway server and replace a failed master node, the slave load balancing cluster including at least two slave nodes configured to recover data in the failed master node, and wherein a number of slave nodes in the slave load balancing cluster is less than a number of master nodes in the master load balancing cluster, the apparatus comprising:
    at least one processor; and
    a memory storing instructions, wherein the instructions when executed by the at least one processor, cause the at least one processor to perform operations, the operations comprising:
    selecting a master node from the master load balancing cluster as a first master node in response to receiving a first persistent connection request from a client, wherein the first persistent connection request is used to enable the first master node to establish a persistent connection between the client and a service server based thereon and to generate session information; and
    in response to determining that the first master node fails, performing following operations: selecting a master node different from the first master node from the master load balancing cluster as a second master node, wherein data from the first master node is sent to the second master node; selecting a slave node from the slave load balancing cluster as a first slave node, and controlling the second master node to transmit data from the first master node to the first slave node to cause the first slave node to maintain a persistent connection between the client and the service server based on the session information.

8. The apparatus of claim 7, wherein the selecting the master node from the master load balancing cluster as the first master node comprises:

acquiring load information of the master node in the master load balancing cluster; and selecting the master node as the first master node from the master load balancing cluster by using a load balancing algorithm.

9. The apparatus of claim 7, wherein the first master node is configured to synchronize the session information into a cache cluster.

10. The apparatus of claim 9, wherein the selecting the slave node from the slave load balancing cluster as the first slave node, and controlling the second master node to transmit data from the first master node to the first slave node comprises:

controlling the second master node to receive data in the first master node; and selecting the slave node from the slave load balancing cluster as the first slave node, and controlling the second master node to transmit data from the first master node to the first slave node, wherein the first slave node obtains the session information from the cache cluster, and determines the client and the service server that establish the persistent connection through the first master node based on the session information.

11. The apparatus of claim 7, wherein after selecting the slave node from the slave load balancing cluster as the first slave node, and controlling the second master node to transmit data from the first master node to the first slave node, the operations further comprise:

forwarding a second persistent connection request to the second master node in response to receiving the second persistent connection request from the client; and controlling the second master node to forward the second persistent connection request from the client to the first slave node, wherein the first slave node forwards the second persistent connection request from the client to the service server based on the session information.

12. The apparatus of claim 11, wherein the first slave node is configured to update the session information.

13. A non-transitory computer readable medium, storing a computer program thereon, wherein the program, when executed by a processor, causes the processor to perform operations, the operations comprising:

selecting a master node from a master load balancing cluster as a first master node in response to receiving a first persistent connection request from a client, wherein the first persistent connection request is used to enable the first master node to establish a persistent connection between the client and a service server based thereon and to generate session information; and in response to determining that the first master node fails, performing following operations: selecting a master node different from the first master node from the master load balancing cluster as a second master node, wherein data from the first master node is sent to the second master node; selecting a slave node from a slave load balancing cluster as a first slave node, and controlling the second master node to transmit data from the first master node to the first slave node to cause the first slave node to maintain a persistent connection between the client and the service server based on the session information; wherein the master load balancing cluster including at least two master nodes configured to balance traffic in the gateway server and replace a failed master node, the slave load balancing cluster including at least two slave nodes configured to recover data in the failed master node, and wherein a number of slave nodes in the slave load balancing cluster is less than a number of master nodes in the master load balancing cluster.

14. The non-transitory computer readable medium of claim 13, wherein the selecting the master node from the master load balancing cluster as the first master node comprises:

acquiring load information of the master node in the master load balancing cluster; and selecting the master node as the first master node from the master load balancing cluster by using a load balancing algorithm.

15. The non-transitory computer readable medium of claim 13, wherein the first master node is configured to synchronize the session information into a cache cluster.

16. The non-transitory computer readable medium of claim 15, wherein the selecting the slave node from the slave load balancing cluster as the first slave node, and controlling the second master node to transmit data from the first master node to the first slave node comprises:

controlling the second master node to receive data in the first master node; and selecting the slave node from the slave load balancing cluster as the first slave node, and controlling the second master node to transmit data from the first master node to the first slave node, wherein the first slave node obtains the session information from the cache cluster, and determines the client and the service server that establish the persistent connection through the first master node based on the session information.

17. The non-transitory computer readable medium of claim 13, wherein after selecting the slave node from the slave load balancing cluster as the first slave node, and controlling the second master node to transmit data from the first master node to the first slave node, the operations further comprise:

forwarding a second persistent connection request to the second master node in response to receiving the second persistent connection request from the client; and controlling the second master node to forward the second persistent connection request from the client to the first slave node, wherein the first slave node forwards the second persistent connection request from the client to the service server based on the session information.

18. The non-transitory computer readable medium of claim 17, wherein the first slave node is configured to update the session information.

* * * * *